United States Patent
Miyamura et al.

(10) Patent No.: US 11,823,709 B2
(45) Date of Patent: Nov. 21, 2023

(54) WRITE PERFORMANCE BY ENABLING HOST DATA TRANSFER IMMEDIATELY AFTER A REPOSITION COMMAND

(71) Applicant: International Business Machines Corporation, Armonk, NY (US)

(72) Inventors: Tsuyoshi Miyamura, Yokohama (JP); Noriko Yamamoto, Tokyo (JP); Atsushi Abe, Ebina (JP); Shinsuke Mitsuma, Machida (JP); Hiroshi Itagaki, Yokohama (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 17/400,170

(22) Filed: Aug. 12, 2021

(65) Prior Publication Data
US 2023/0052640 A1    Feb. 16, 2023

(51) Int. Cl.
 *G11B 5/588* (2006.01)
 *G11B 15/06* (2006.01)
 *G11B 15/093* (2006.01)

(52) U.S. Cl.
 CPC ............ *G11B 15/06* (2013.01); *G11B 15/093* (2013.01)

(58) Field of Classification Search
 CPC ......... G11B 5/54; G11B 7/085; G11B 15/689; G11B 15/135; G11B 20/1201; G11B 2020/1291; G11B 15/32; G11B 5/00813; G11B 15/093; G11B 15/43; G11B 5/00817; G11B 5/00891; G11B 5/588
 USPC ........................................ 360/92.1, 77.12, 75
 See application file for complete search history.

(56) References Cited

U.S. PATENT DOCUMENTS

| | | | |
|---|---|---|---|
| 8,599,511 | B2 | 12/2013 | Shiratori |
| 9,330,713 | B2 | 5/2016 | Shiratori |
| 9,601,141 | B2 | 3/2017 | Shiratori |
| 2005/0162991 | A1* | 7/2005 | Matsuura ............ G11B 33/125 |
| 2012/0127607 | A1* | 5/2012 | Thompson ........... G11B 15/689 |
| | | | 360/92.1 |
| 2014/0226236 | A1 | 8/2014 | Shiratori |
| 2019/0227992 | A1 | 7/2019 | Abe |
| 2019/0272106 | A1 | 9/2019 | Ashida |
| 2019/0371364 | A1 | 12/2019 | Hasegawa |
| 2021/0118470 | A1 | 4/2021 | Miyamura |

FOREIGN PATENT DOCUMENTS

| | | |
|---|---|---|
| JP | 2010004936 A | 1/2012 |
| JP | 2016071766 A | 5/2016 |

* cited by examiner

*Primary Examiner* — Nabil Z Hindi
(74) *Attorney, Agent, or Firm* — Jordan T. Schiller

(57) ABSTRACT

In an approach to improving write performance by enabling host data transfer immediately after a reposition command, responsive to receiving on a tape drive a reposition command from a host, a ready response is returned to the host. Write data from the host is accumulated in a write buffer, where the write data is accumulated in the write buffer while simultaneously moving a tape media in the tape drive to a target location. The write data from the write buffer is written to the tape media immediately after the target location is reached on the tape drive.

18 Claims, 6 Drawing Sheets

WRITE PERFORMANCE BY ENABLING HOST DATA TRANSFER IMMEDIATELY AFTER A REPOSITION COMMAND

BACKGROUND

The present invention relates generally to the field of tape-based data storage, and more particularly to improving write performance by enabling host data transfer immediately after a reposition command.

Magnetic tape data storage is a system for storing digital information on magnetic tape using digital recording. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction. The first commercial digital-tape storage system stored roughly a megabyte of data on one reel of tape, but modern cartridges hold 20 terabytes or more, and the capacity is constantly increasing.

The reason magnetic tape drives are still in use today, especially as an offline data backup is because of long archival stability and very favorable unit costs. Although data stored on tape cannot be accessed as quickly as data stored on hard drives, the storage is more energy efficient and reliable. Magnetic tape storage is also more cost effective, typically as little as one-sixth the cost to store the same amount of data on a disk. And while the rate for increasing capacity for disc drives is decreasing, the capacity for storage on magnetic tape still increases approximately 33 percent each year.

SUMMARY

Embodiments of the present invention include a computer-implemented method, computer program product, and system for improving write performance by enabling host data transfer immediately after a reposition command. In one embodiment, responsive to receiving on a tape drive a reposition command from a host, a ready response is returned to the host. Write data from the host is accumulated in a write buffer, where the write data is accumulated in the write buffer while simultaneously moving a tape media in the tape drive to a target location. The write data from the write buffer is written to the tape media immediately after the target location is reached on the tape drive.

DETAILED DESCRIPTION

Figure 1:
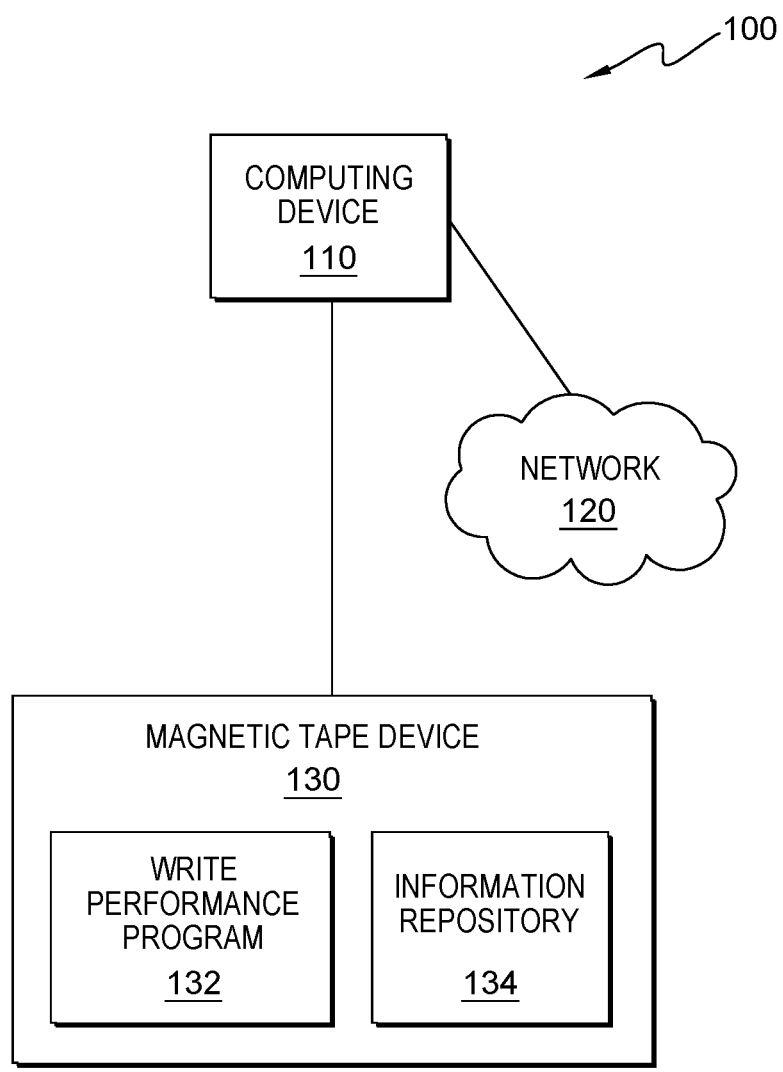
FIG. 1 is a functional block diagram illustrating a distributed data processing environment, in accordance with an embodiment of the present invention.

The tape drive is a sequential device, which when writing data must first move to the writing position before it can begin writing. For a typical tape commonly in use today it takes 87 seconds to move to the farthest position on the tape and an extra 3 seconds to adjust the position, therefore it takes about 90 seconds even when the tape runs at a maximum moving speed.

For commands executed by the tape drive, a READY response is returned to the host after the command processing is complete. When the host receives the READY, it issues the next command. For example, reposition commands such as Space, Locate, and Rewind for moving to the target record position return READY to the host after the tape drive successfully reads the target record on the tape and confirms its presence, unless the IMMED option, to be described later, is specified. This is because the record specified by the host may not actually exist, or even if it does exist, it may not be read due to problems on the media.

Some commands return READY immediately even if the command processing is not completed. For example, the Write command is to be started only after a certain amount of data has been accumulated in the tape drive buffer, since the data can be written to the tape faster when written continuously without having to wait to reposition the tape. Therefore, even if the data written by the Write command has not yet been written to the tape, READY is returned to the host immediately after the data is stored in the buffer on the tape drive.

The Locate command, one of the reposition commands, uses an argument to specify the absolute record position of a record to be moved. The Space command, which is another reposition command specifies the relative record position of a record to be moved with reference to the current position. The Rewind command is a type of locate command that moves the tape to the beginning position of the tape, i.e., record 0. In addition to records, a file delimiter called a file mark (FM) may be written on the tape. The FM can be specified instead of the record in the Reposition command.

The Space command can specify the end of data (EOD), the position immediately after the last data record, by using a different argument than the argument used for relative record position. When EOD is specified, the relative record position is ignored, and the tape is moved to the EOD. Since the tape drive is a sequential device, it is necessary to move the tape to the EOD in advance in order to write a new record without erasing existing records. The command executed to move the tape to EOD is called a Space EOD command.

The tape drive records FM as a file delimiter, but there are some application programs that record another FM behind the last written file. These applications result in two FMs recorded at the end of the tape. To write a new record, the Space EOD command is followed by the Space FM command to move the tape to the FM position right before the last FM, after which the Write command is issued so that only one file delimiter is entered. Usually, after execution of the Space EOD, the Write command or Space FM command is executed and then followed by Write commands.

Figure 2:
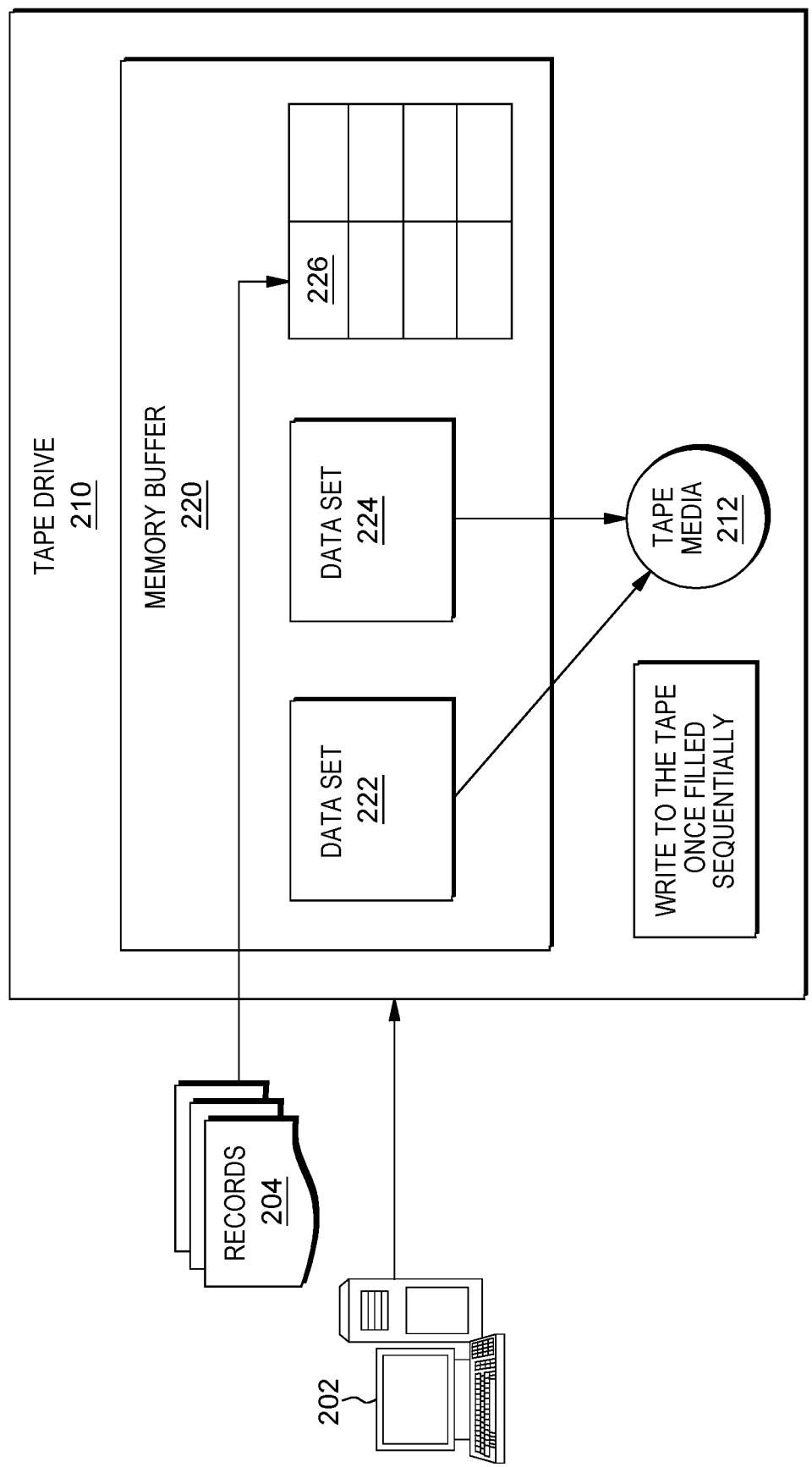
FIG. 2 illustrates an example of writing data to a magnetic tape device within the distributed data processing environment of FIG. 1, in accordance with an embodiment of the present invention.

Some tape commands can specify the immediate (IMMED) option. If the IMMED option is specified, READY can be returned to the host when the tape drive receives the command. The normal Write command prompts writing data to the tape drive, but the data is actually written to a buffer on the tape drive, not to the tape media. An example of this is shown in FIG. 2 below. When a certain amount of data has been accumulated in the buffer, the tape drive writes the data to the tape all at once. The Write FM command, however, instructs the tape drive to write an FM to the tape and simultaneously instructs the tape drive to return READY to the host only after it has completed writing the data accumulated in the buffer to the tape. If a Write FM command that supports the IMMED option is issued, the tape drive will return READY to the host as soon as the tape drive receives the command, without writing any data to the tape.

The Locate and Rewind commands included in the Reposition commands also have a mechanism for returning READY immediately when IMMED is specified with an argument. However, in this case, even if a data transfer request is subsequently made by the Write command, the data transfer is not allowed until the tape drive reads a target record from the tape and confirms its presence.

In any conventional commands, the tape needs to be moved to the target record position before the tape drive starts writing. The present invention proposes a mechanism for shortening the time required for writing data based on a mechanism for allowing data to be written from the host while simultaneously moving the tape to the target record position.

In an embodiment of the present invention, when the Locate command or Space command is issued the tape drive confirms that the EOD exists and then immediately returns READY to the host. Simultaneously, the tape drive divides the buffer into an area for reposition and an area for write. The data read from the tape during repositioning is written in the area for reposition, but it is not transferred to the host. When the Write command is issued while moving the tape to the target record specified by the Locate command or Space command, the record written by the Write command is stored in the tape drive buffer area reserved for writing data, or write buffer, and as soon as the target record is reached in repositioning, the tape drive writes the data from the write buffer to the tape media.

The present invention is a mechanism for receiving a write request from the host immediately after receiving the Space EOD command by monitoring the sequence of commands to determine if the Space EOD command is followed by any Write command. A reposition command except for the Locate or Space EOD command may also be followed by any Write command. Therefore, when receiving a command, the present invention prompts the tape drive to confirm a state meeting certain conditions, and then returns READY to the host to receive a write request. The conditions that must be met are first, whether a record specified by the Locate or Space command is written and exists on the tape and second, the number of the last record written on the tape. Whether a record specified by the Locate or Space command is written and exists on the tape can be confirmed by verifying the last record of the EOD in the tape drive memory, e.g., a cartridge memory (CM), and the number of the last record written on the tape can be confirmed by verifying EOD validity. At the point of validating the target record written on the tape, the Locate or Space command prompts the tape drive to return READY to the host.

Because the READY is issued to the host immediately, the host can issue the next command. When a Write command is issued, the tape drive can store data written from the host in the write buffer while moving the tape to the target position specified by the Locate or Space command. Therefore, the tape drive can start writing the data stored in the buffer to the tape as soon as the target position is reached during repositioning. This leads to improved write performance.

The conventional mechanism, in which data transfer can be started only after a target record position is reached, does not allow the tape drive to start writing data from the host before a target record is reached. The present invention, however, allows earlier execution of the Write command because the host can begin writing to the tape drive as soon as the tape drive receives the Reposition command and before the target record is reached. Therefore, the performance of both movement and writing is improved.

FIG. 1 is a functional block diagram illustrating a distributed data processing environment, generally designated 100, suitable for operation of write performance program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120 and magnetic tape device 130 connected to computing device 110. In an embodiment, computing device 110 is the host that is transferring data to/from the tape device. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, magnetic tape device 130 includes write performance program 132. In an embodiment, write performance program 132 is a program, application, or subprogram of a larger program for improving write performance by enabling host data transfer immediately after a reposition command.

In an embodiment, magnetic tape device 130 includes information repository 134. In an embodiment, information repository 134 may be managed by write performance program 132. In an alternate embodiment, information repository 134 may be managed by the operating system of the device, alone, or together with, write performance program 132. Information repository 134 is a data repository that can store, gather, compare, and/or combine information. In some embodiments, information repository 134 is located externally to magnetic tape device 130 and accessed through a communication network, such as network 120. In some embodiments, information repository 134 is stored on magnetic tape device 130. In some embodiments, information repository 134 may reside on another computing device (not shown), provided that information repository 134 is accessible by magnetic tape device 130. Information repository 134 includes, but is not limited to, tape drive configuration data, tape EOD data, tape cartridge data, tape data set data, tape cartridge configuration data, filesystem data, and other data that is received by write performance program 132 from one or more sources, and data that is created by write performance program 132.

Information repository 134 may be implemented using any volatile or non-volatile storage media for storing information, as known in the art. Similarly, information repository 134 may be implemented with any suitable storage architecture known in the art, such as a relational database, an object-oriented database, or one or more tables.

FIG. 2 illustrates an example of writing data to a magnetic tape device within the distributed data processing environment of FIG. 1, in accordance with an embodiment of the present invention. In the example illustrated in FIG. 2, host 202 is writing data to tape drive 210. The data is written by host 202 as a series of records 204. Tape drive 210 can only rewind or wind the tape at a certain speed. When the target position has been reached, the drive start writing data sets on the tape past the target position. If the next data set is not ready, the drive will rewind or wind the tape to start writing. This type of operation is very time consuming; as mentioned above, this can take 90 seconds or more. Therefore, the drive starts writing data sets in a buffer, memory buffer 220 in this example. In this example, records 204 are being written into data set 226 of memory buffer 220. Data set 222 and data set 224 of memory buffer 220 represent full data sets. Once a series of data sets is full, it is written to the actual tape media, which is tape media 212 in this example.

Figure 3:
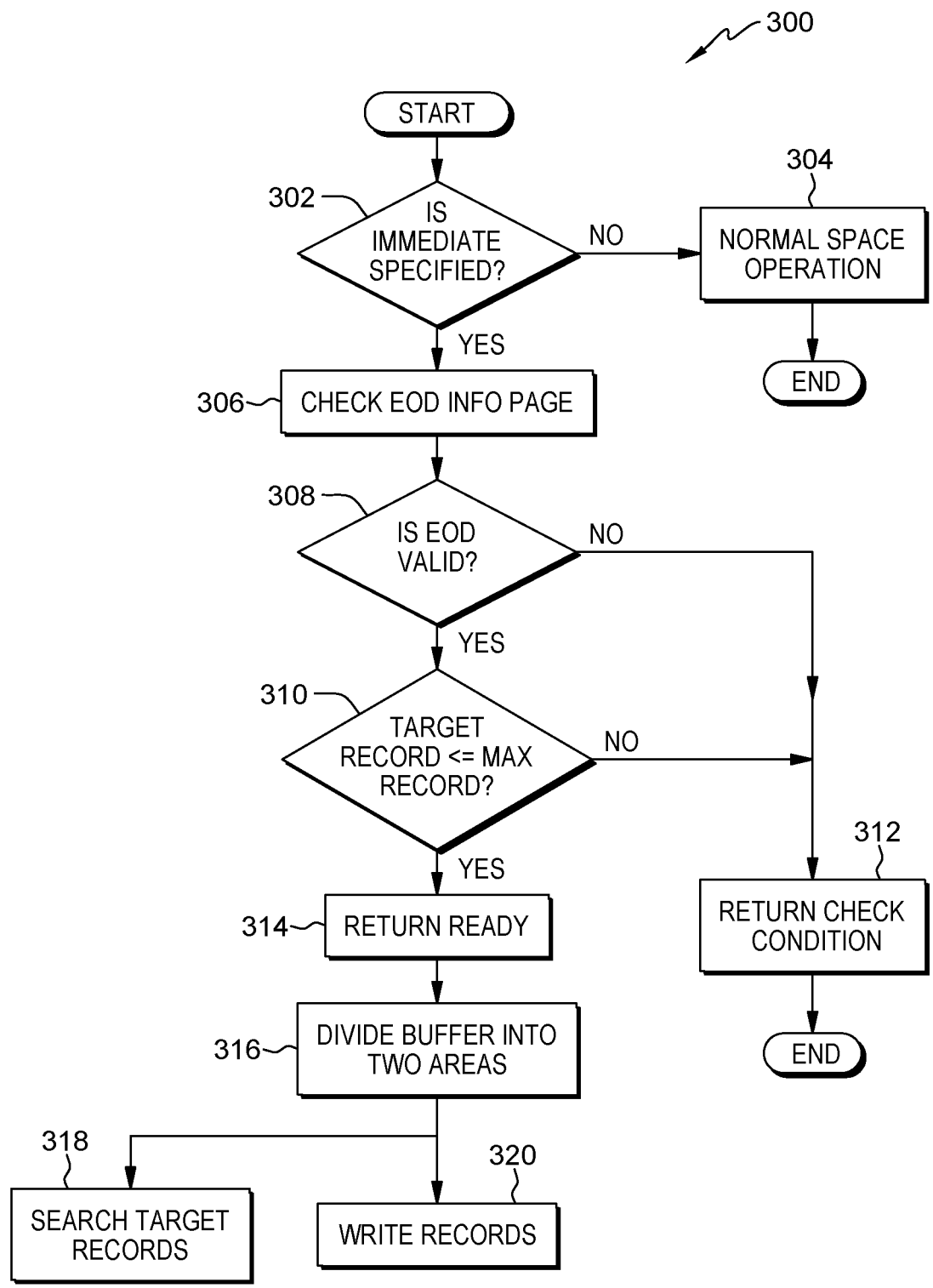
FIG. 3 is the section of the write performance program that handles a reposition command on a tape drive within the distributed data processing environment of FIG. 1, in accordance with an embodiment of the present invention.

FIG. 3 is a flow chart diagram of workflow 300 depicting operational steps for the section of write performance program 132 that handles a reposition command on a tape drive within the distributed data processing environment of FIG. 1, in accordance with an embodiment of the present invention. In an alternative embodiment, the steps of workflow 300 may be performed by any other program while working with write performance program 132. It should be appreciated that embodiments of the present invention provide at least for operational steps performed by write performance program 132 for improving write performance by enabling host data transfer immediately after a reposition command. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 3 illustrates one possible iteration of the operational steps performed by the section of write performance program 132 that handles a reposition command, which repeats each time a reposition command is received by write performance program 132.

In an embodiment, write performance program 132 determines if the IMMEDIATE parameter was specified in the issued command. In an embodiment, if write performance program 132 determines that the IMMEDIATE parameter was not specified in the issued command, then a normal space operation will be performed by the tape drive. Therefore, write performance program 132 ends for this cycle. In an embodiment, if write performance program 132 determines that the IMMEDIATE parameter was specified in the issued command, then write performance program 132 checks the EOD information page in the memory on the tape media, e.g., a cartridge memory (CM), to confirm the validity of the EOD. In an embodiment, write performance program 132 determines if the EOD retrieved in step 306 is valid. In an embodiment, if the reposition command is not a Space EOD command, then write performance program 132 determines if the target record specified in the command is less than or equal to the maximum record number. In an embodiment, if write performance program 132 determines that either the EOD that was specified in the issued command is not valid or the target record specified in the command is not less than or equal to the maximum record number, then there is a problem with the execution of the command, and therefore write performance program 132 returns the CHECK CONDITION signal to the host. In an embodiment, if write performance program 132 determines that the EOD that was specified in the issued command is valid (for any reposition command) and the target record specified in the command is less than or equal to the maximum record number (for a command other than a Space EOD command), then write performance program 132 returns the READY signal to the host. In an embodiment, write performance program 132 divides the memory buffer of the tape drive, e.g., memory buffer 220 of FIG. 2, into two areas, an area used for searching for the target record and an area used for storing records written from the host.

Write performance program 132 determines if the IMMEDIATE parameter was specified (decision block 302). In an embodiment, write performance program 132 determines if the IMMEDIATE parameter was specified in the issued command (decision block 302). In an embodiment, if write performance program 132 determines that the IMMEDIATE parameter was not specified in the issued command ("no" branch, decision block 302), then write performance program 132 proceeds to step 304. In an embodiment, if write performance program 132 determines that the IMMEDIATE parameter was specified in the issued command ("yes" branch, decision block 302), then write performance program 132 proceeds to step 306.

Write performance program 132 performs a normal space operation (step 304). In an embodiment, if write performance program 132 determines that the IMMEDIATE parameter was not specified in the issued command, then a normal space operation will be performed by the tape drive. Therefore, write performance program 132 ends for this cycle.

Write performance program 132 checks the EOD info page (step 306). In an embodiment, if write performance program 132 determines that the IMMEDIATE parameter was specified in the issued command, then write performance program 132 checks the EOD information page in the memory on the tape media, e.g., a cartridge memory (CM), to confirm the validity of the EOD.

Write performance program 132 determines if the EOD is valid (decision block 308). In an embodiment, write performance program 132 determines if the EOD retrieved in step 306 is valid (decision block 308). In an embodiment, write performance program 132 determines if the EOD is valid based on the information retrieved from the EOD information page in step 306. In an embodiment, a valid state of EOD may be divided into 0: Undefined, 1: Valid, 2: Absence of EOD due to power off during writing, etc., 3: Write error, etc. In an embodiment, when the EOD is valid, write performance program 132 returns READY to the host.

In an embodiment, if write performance program 132 determines that the EOD retrieved in step 306 is not valid ("no" branch, decision block 308), then write performance program 132 proceeds to step 312. In an embodiment, if write performance program 132 determines the EOD retrieved in step 306 is valid ("yes" branch, decision block 308), then write performance program 132 proceeds to decision block 310.

Write performance program 132 determines if the target record <=max records (decision block 310). In an embodiment, if the reposition command is a Space EOD command, then the target record from the command is ignored, and write performance program 132 instead navigates to the EOD location specified in the EOD information page in the memory on the tape media.

In an embodiment, if the reposition command is not a Space EOD command, then write performance program 132 determines if the target record specified in the command is less than or equal to the maximum record number (decision block 310). In an embodiment, a partition is a logical volume of a tape, and the maximum record number is the number of records in the partition. In an embodiment, write performance program 132 reads the maximum record number that is written in the EOD information page in the partition. In an embodiment, if write performance program 132 determines that the target record specified in the command is not less than or equal to the maximum record number that is written in the EOD information page in the partition ("no" branch, decision block 310), then there is an error, and write performance program 132 proceeds to step 312. In an embodiment, if write performance program 132 determines that the target record specified in the command is less than or equal to the maximum record number ("yes" branch, decision block 310), then write performance program 132 proceeds to step 314.

Write performance program 132 returns a CHECK CONDITION signal (step 312). In an embodiment, if write performance program 132 determines that either the EOD that was specified in the issued command is not valid or the target record specified in the command is not less than or equal to the maximum record number, then there is a problem with the execution of the command, and therefore write performance program 132 returns the CHECK CONDITION signal to the host. The CHECK CONDITION signal is a standard response that indicates a problem with the execution of the command. Write performance program 132 then ends for this cycle.

Write performance program 132 returns a READY signal (step 314). In an embodiment, if write performance program 132 determines that the EOD that was specified in the issued command is valid (for any reposition command) and the target record specified in the command is less than or equal to the maximum record number (for a command other than a Space EOD command), then write performance program 132 returns the READY signal to the host. In an embodiment, write performance program 132 returns the READY signal to the host to allow the host to continue write operations while the tape drive searches for the target record. This allows both the search and the writing to occur simultaneously.

Write performance program 132 divides the buffer into two regions (step 316). In an embodiment, write performance program 132 divides the memory buffer of the tape drive, e.g., memory buffer 220 of FIG. 2, into two areas, an area used for searching for the target record, e.g., a reposition buffer, and an area used for storing records written from the host, e.g., a write buffer. In an embodiment, once write performance program 132 has divided the buffer into two areas, write performance program 132 then executes step 318 and step 320 in parallel.

Write performance program 132 searches target records (step 318). The procedure to search for target records is shown in FIG. 4 below.

Figure 5:
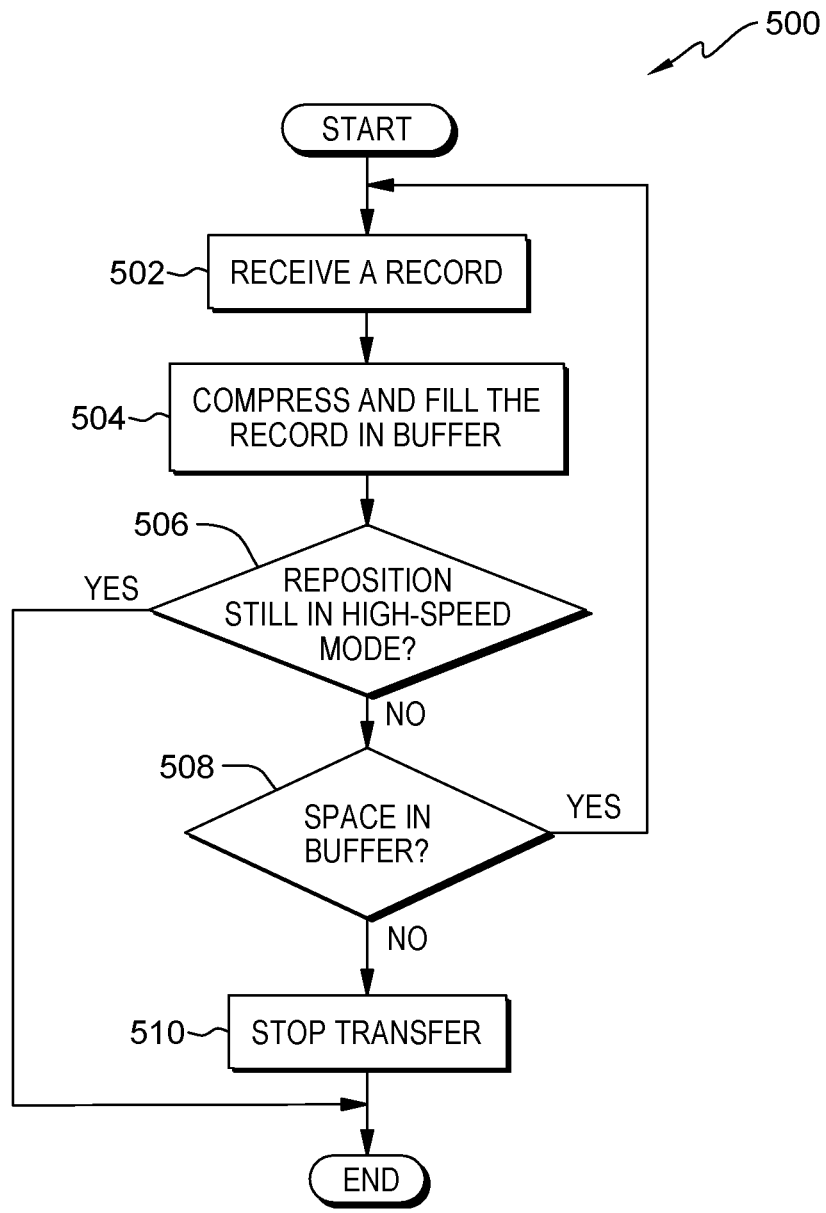
FIG. 5 is the section of the write performance program that writes the records on a tape drive within the distributed data processing environment of FIG. 1, in accordance with an embodiment of the present invention.

Write performance program 132 writes records (step 320). The procedure to write records is shown in FIG. 5 below.

Figure 4:
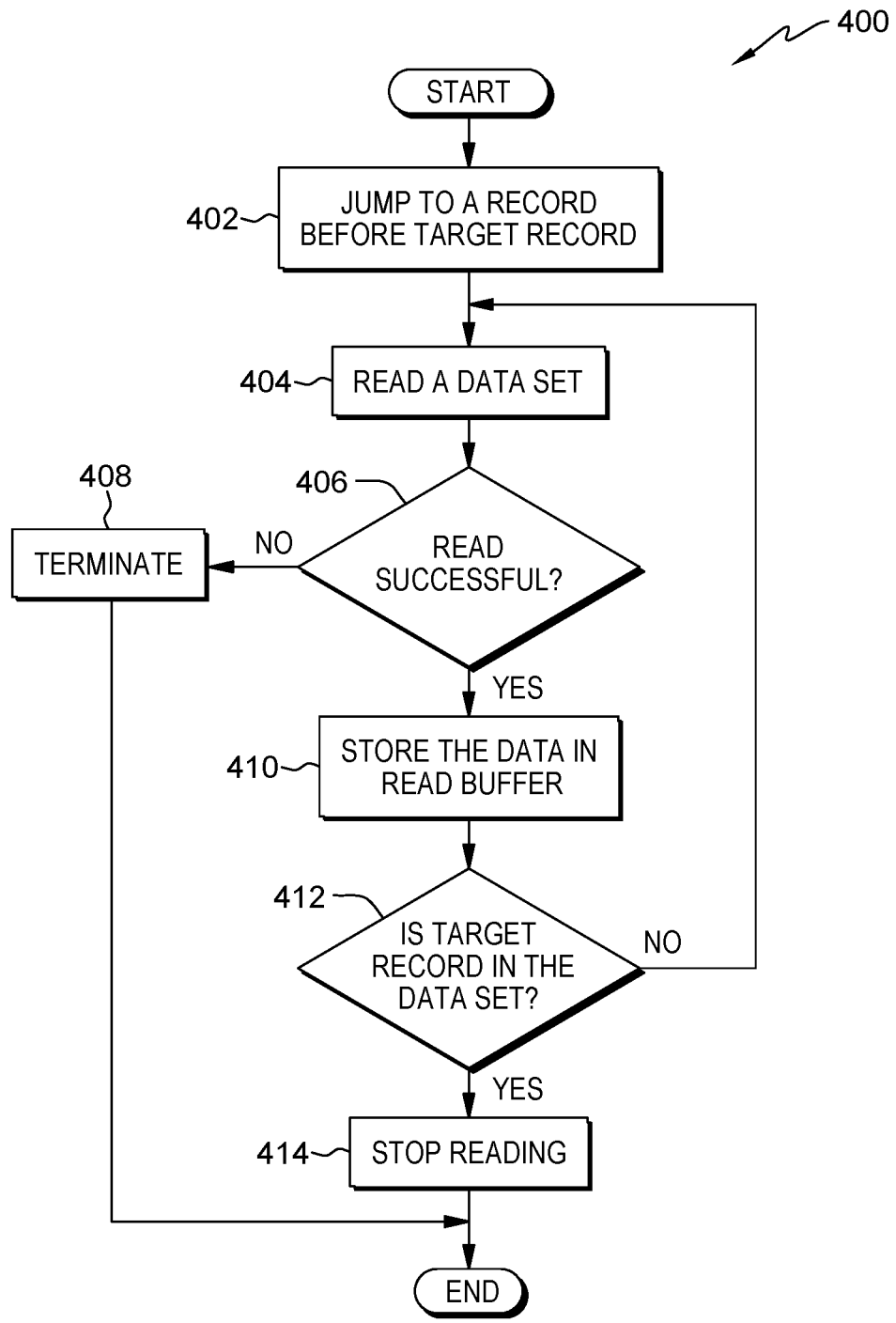
FIG. 4 is the section of the write performance program that performs a search for the target record on a tape drive within the distributed data processing environment of FIG. 1, in accordance with an embodiment of the present invention.

FIG. 4 is a flow chart diagram of workflow 400 depicting operational steps for the section of write performance program 132 that performs a search for the target record on a tape drive within the distributed data processing environment of FIG. 1, in accordance with an embodiment of the present invention. In an alternative embodiment, the steps of workflow 400 may be performed by any other program while working with write performance program 132. It should be appreciated that embodiments of the present invention provide at least for operational steps performed by write performance program 132 for improving write performance by enabling host data transfer immediately after a reposition command. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims. In an embodiment, the procedure of FIG. 4 and the procedure of FIG. 5 below will run in parallel upon the successful completion of the procedure of FIG. 3 above.

It should be appreciated that the process depicted in FIG. 4 illustrates one possible iteration of the operational steps performed by the section of write performance program 132 that performs a search for the target record, which repeats each time a reposition command is received once the reposition command has been validated by the procedure in FIG. 3 above.

In an embodiment, write performance program 132 jumps to a record prior to the target record. In an embodiment, write performance program 132 reads a data set off the tape to determine if the target record has been found. In an embodiment, write performance program 132 determines if the data set read operation of step 404 was successful. In an embodiment, if write performance program 132 determines that the data set read operation of step 404 was not successful, then the operation cannot continue. Therefore, write performance program 132 ends for this cycle. In an embodiment, if write performance program 132 determines that the data set read operation of step 404 was successful, then write performance program 132 stores the data read from the data set in the read buffer area of the tape drive memory buffer that was established in step 316 in FIG. 3 above. In an embodiment, write performance program 132 determines if the data set read in step 404 contains the target record. In an embodiment, if write performance program 132 determines that the target record from the reposition command is recorded in the data set read in step 404, then the tape drive has reached the position to start writing data to the tape media, and therefore write performance program 132 stops reading data. In an embodiment, the section of write performance program 132 that performs the search for the target record then ends for this cycle.

Write performance program 132 jumps to a record before target record (step 402). In an embodiment, write performance program 132 jumps to a record prior to the target record. In an embodiment, the tape drive moves the tape at a high speed by using only positional information on the tape without reading data on the tape until the tape is in the vicinity of a target record. In an embodiment, when approaching the target record, the tape drive reduces the tape speed to a level allowing reading/writing data on the tape and then starts reading the data set while suspending writing records from the host. In an embodiment, to change the tape speed, the tape needs to be stopped and wound back a short distance, followed by being accelerated to a target speed. In a typical example of a tape drive, the tape jumps to a record approximately four meters prior to the target record.

Write performance program 132 reads a data set (step 404). In an embodiment, write performance program 132 reads a data set off the tape to determine if the target record has been found. In an embodiment, a Data Set Information Table (DSIT) is written in a part of the data set which describes information of the data set. In an embodiment, the data sets written to the tape media are compressed. The DSIT, however, is generated by the tape drive without compression or encryption. It contains information such as first record number in the data set, number of records in the data set, etc. Using the information, the drive can determine if the target record exists in the data set or not.

In an embodiment, write performance program 132 determines if the read was successful (decision block 406). In an embodiment, write performance program 132 determines if the data set read operation of step 404 was successful. In an embodiment, write performance program 132 determines that the data set read operation of step 404 was successful if valid data was retrieved from the tape.

In an embodiment, if write performance program 132 determines that the data set read operation of step 404 was not successful ("no" branch, decision block 406), then write performance program 132 proceeds to step 408 to terminate the operation. In an embodiment, if write performance program 132 determines that the data set read operation of step 404 was successful ("yes" branch, decision block 406), then write performance program 132 proceeds to step 410.

Write performance program 132 terminates (step 408). In an embodiment, if write performance program 132 determines that the data set read operation of step 404 was not successful, then the operation cannot continue. Therefore, write performance program 132 ends for this cycle.

Write performance program 132 stores the data in the read buffer (step 410). In an embodiment, if write performance program 132 determines that the data set read operation of step 404 was successful, then write performance program 132 stores the data read from the data set in the reposition buffer area of the tape drive memory buffer that was established in step 316 in FIG. 3 above.

In an embodiment, write performance program 132 determines if the data set contains the target record (decision block 412). In an embodiment, write performance program 132 determines if the data set read in step 404 contains the target record by reading the DSIT to gather information that describes the data set. In another embodiment, write performance program 132 determines if the data set read in step 404 contains the target record from the reposition command. In an embodiment, if write performance program 132 determines that the target record from the reposition command is not recorded in the data set read in step 404 ("no" branch, decision block 412), then write performance program 132 returns to step 404 to retrieve the next data set. In an embodiment, if write performance program 132 determines that the target record from the reposition command is recorded in the data set read in step 404 ("yes" branch, decision block 412), then write performance program 132 proceeds to step 414.

Write performance program 132 stops reading (step 414). In an embodiment, if write performance program 132 determines that the target record from the reposition command is recorded in the data set read in step 404, then the tape drive has reached the position to start writing data to the tape media, and therefore write performance program 132 stops reading data. In an embodiment, the section of write performance program 132 that performs the search for the target record then ends for this cycle.

FIG. 5 is a flow chart diagram of workflow 500 depicting operational steps for the section of write performance program 132 that writes the records on a tape drive within the distributed data processing environment of FIG. 1, in accordance with an embodiment of the present invention. In an alternative embodiment, the steps of workflow 500 may be performed by any other program while working with write performance program 132. It should be appreciated that embodiments of the present invention provide at least for operational steps performed by write performance program 132 for improving write performance by enabling host data transfer immediately after a reposition command. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims. In an embodiment, the procedure of FIG. 5 and the procedure of FIG. 4 above will run in parallel upon the successful completion of the procedure of FIG. 3 above.

It should be appreciated that the process depicted in FIG. 5 illustrates one possible iteration of the operational steps performed by the section of write performance program 132 that writes the records on a tape drive, which repeats each time a reposition command is received once the reposition command has been validated by the procedure in FIG. 3 above.

It should be appreciated that embodiments of the present invention provide at least for operational steps performed by write performance program 132 for improving write performance by enabling host data transfer immediately after a reposition command. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, write performance program 132 continuously receives data from the host while the search procedure executes. In an embodiment, write performance program 132 compresses the records that were transferred from the host according to the Write command. In an embodiment, write performance program 132 determines if the area of the tape drive memory buffer that was established for storing the write data is full. In an embodiment, when the area for storing records written from the host becomes full, write performance program 132 suspends writing data and interrupts the data transfer from the host. In an embodiment, the section of write performance program 132 that writes the records then ends for this cycle.

Write performance program 132 receives a record (step 502). In an embodiment, write performance program 132 continuously receives data from the host while the search procedure executes.

Write performance program 132 compresses and fills the record in buffer (step 504). In an embodiment, write performance program 132 compresses the records that were transferred from the host according to the Write command. In an embodiment, write performance program 132 then stores the compressed data in the write buffer that was established in step 316 of FIG. 3 above.

In an embodiment, write performance program 132 determines if the reposition is still in high-speed mode (decision block 506). In an embodiment, write performance program 132 determines if the tape drive is still moving the tape at a high speed by using only positional information on the tape without reading data on the tape. In an embodiment, if write performance program 132 determines that the tape drive is not still moving the tape at a high speed by using only positional information on the tape without reading data on the tape ("no" branch, decision block 506), then write performance program 132 proceeds to decision block 508 to determine if there is space in the buffer. In an embodiment, if write performance program 132 determines that the tape drive is still moving the tape at a high speed by using only positional information on the tape without reading data on the tape ("yes" branch, decision block 506), then write performance program 132 proceeds to step 510 to stop the current transfer.

In an embodiment, write performance program 132 determines if there is space in the buffer (decision block 508). In an embodiment, write performance program 132 determines if the write buffer established in step 316 of FIG. 3 above is full. In an embodiment, if write performance program 132 determines that there is no space available in the write buffer ("no" branch, decision block 508), then write performance program 132 proceeds to step 508 to terminate the operation. In an embodiment, if write performance program 132 determines that there is space available in the write buffer ("yes" branch, decision block 508), then write performance program 132 returns to step 502 to retrieve the next record.

Write performance program 132 stops the transfer (step 510). In an embodiment, when the area for storing records written from the host becomes full, write performance program 132 suspends writing data and interrupts the data transfer from the host. In an embodiment, if write performance program 132 determines that the data set read operation of step 504 was not successful, or that the tape drive is moving the tape at a high speed by using only positional information on the tape without reading data on the tape, then the operation cannot continue. In an embodiment, the section of write performance program 132 that writes the records then ends for this cycle.

Figure 6:
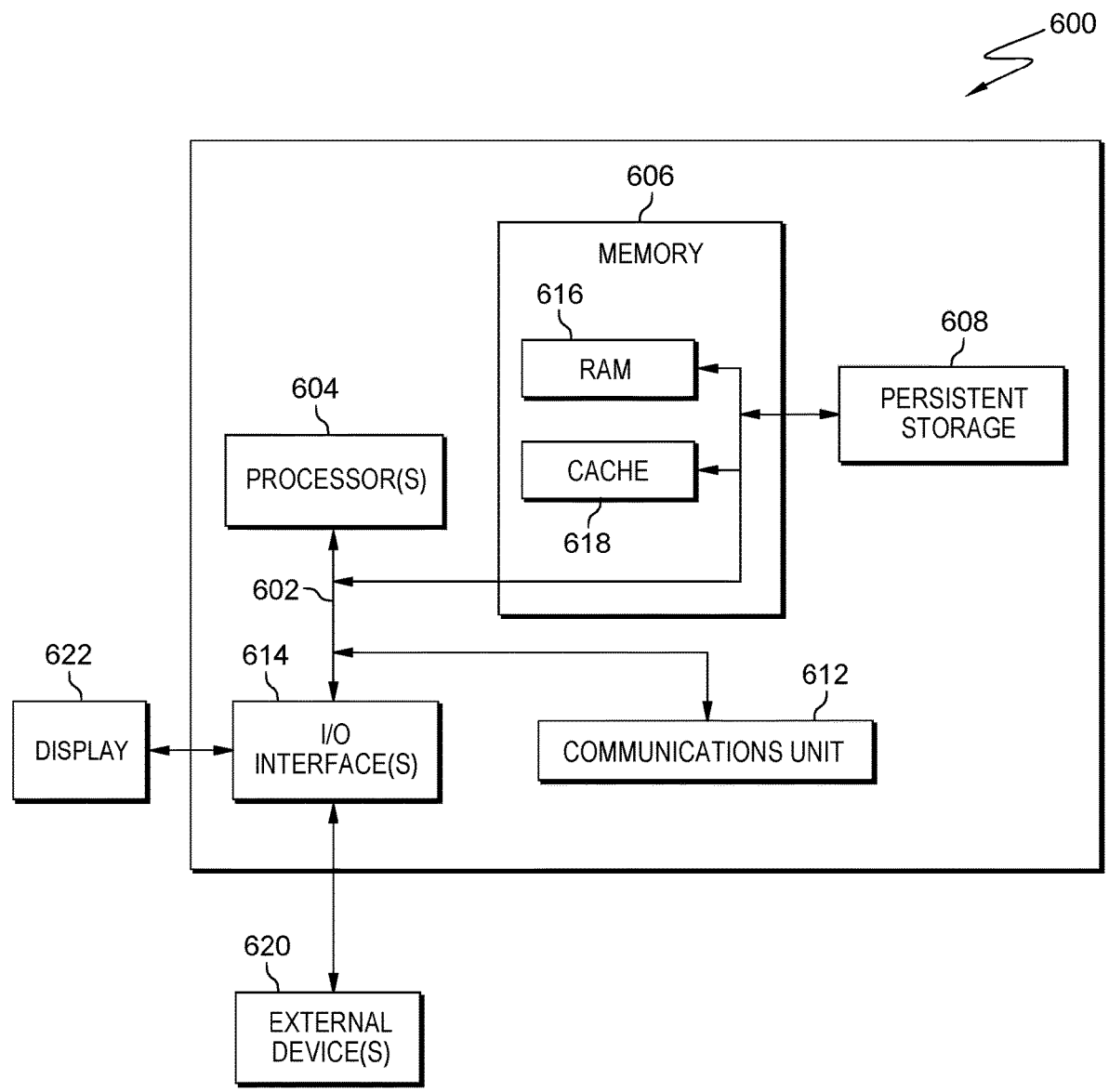
FIG. 6 depicts a block diagram of components of the magnetic tape device executing the write performance program within the distributed data processing environment of FIG. 1, in accordance with an embodiment of the present invention.

FIG. 6 is a block diagram depicting components of computing device 110 suitable for write performance program 132, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for write performance program 132 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600.

For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., write performance program 132, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to receiving on a tape drive a reposition command from a host, returning, by one or more computer processors, a ready response to the host;
   accumulating, by the one or more computer processors, a write data from the host in a write buffer, wherein the write data is accumulated in the write buffer while simultaneously moving a tape media in the tape drive to a target location, wherein the target location is a location of an end of data (EOD); and
   writing, by the one or more computer processors, the write data from the write buffer to the tape media immediately after the target location is reached on the tape drive.

2. The computer-implemented method of claim 1, wherein responsive to receiving on the tape drive the reposition command from the host, returning the ready response to the host comprises:
   responsive to responsive to receiving on the tape drive the reposition command from the host, confirming, by the one or more computer processors, that an end of data (EOD) is present on the tape media in the tape drive; and
   responsive to confirming that the EOD is present on the tape media, returning, by the one or more computer processors, the ready response to the host.

3. The computer-implemented method of claim 2, wherein whether the EOD is present is based on information stored in a cartridge memory in the tape media.

4. The computer-implemented method of claim 1, wherein responsive to receiving on the tape drive the reposition command from the host, returning the ready response to the host further comprises:
   dividing, by the one or more computer processors, a memory buffer in the tape drive into a first area and a second area, wherein the first area is the write buffer and the second area is a reposition buffer.

5. The computer-implemented method of claim 4, wherein accumulating the write data from the host in the write buffer, wherein the write data is accumulated in the write buffer while simultaneously moving the tape media in the tape drive to the target location further comprises:
   reading, by the one or more computer processors, read data from the tape media, wherein the read data is read from the tape media during moving the tape media to the target location; and
   writing, by the one or more computer processors, the read data in the reposition buffer.

6. The computer-implemented method of claim 1, wherein the target location is a target record specified in the reposition command.

7. A computer program product comprising one or more computer readable storage media and program instructions stored on the one or more computer readable storage media, the program instructions including instructions to:
   responsive to receiving on a tape drive a reposition command from a host, returning, by one or more computer processors, a ready response to the host;
   accumulating, by the one or more computer processors, a write data from the host in a write buffer, wherein the write data is accumulated in the write buffer while simultaneously moving a tape media in the tape drive to a target location, wherein the target location is a location of an end of data (EOD); and
   writing, by the one or more computer processors, the write data from the write buffer to the tape media immediately after the target location is reached on the tape drive.

8. The computer program product of claim 7, wherein responsive to receiving on the tape drive the reposition command from the host, return the ready response to the host comprises program instructions stored on the one or more computer readable storage media, to:
   responsive to responsive to receiving on the tape drive the reposition command from the host, confirm that an end of data (EOD) is present on the tape media in the tape drive; and
   responsive to confirming that the EOD is present on the tape media, return the ready response to the host.

9. The computer program product of claim 8, wherein whether the EOD is present is based on information stored in a cartridge memory in the tape media.

10. The computer program product of claim 7, wherein responsive to receiving on the tape drive the reposition command from the host, return a ready response to the host further comprises program instructions stored on the one or more computer readable storage media, to:
    divide a memory buffer in the tape drive into a first area and a second area, wherein the first area is the write buffer and the second area is a reposition buffer.

11. The computer program product of claim 10, wherein accumulate the write data from the host in the write buffer, wherein the write data is accumulated in the write buffer while simultaneously moving the tape media in the tape drive to the target location further comprises program instructions stored on the one or more computer readable storage media, to:
    read a read data from the tape media, wherein the read data is read from the tape media during moving the tape media to the target location; and
    write the read data in the reposition buffer.

12. The computer program product of claim 7, wherein the target location is a target record specified in the reposition command.

13. A computer system comprising:
one or more computer processors;
one or more computer readable storage media; and
program instructions stored on the one or more computer readable storage media for execution by at least one of the one or more computer processors, the stored program instructions including instructions to:
responsive to receiving on a tape drive a reposition command from a host, returning, by one or more computer processors, a ready response to the host;
accumulating, by the one or more computer processors, a write data from the host in a write buffer, wherein the write data is accumulated in the write buffer while simultaneously moving a tape media in the tape drive to a target location, wherein the target location is a location of an end of data (EOD); and
writing, by the one or more computer processors, the write data from the write buffer to the tape media immediately after the target location is reached on the tape drive.

14. The computer system of claim 13, wherein responsive to receiving on the tape drive the reposition command from the host, return the ready response to the host comprises program instructions stored on the one or more computer readable storage media, to:
responsive to responsive to receiving on the tape drive the reposition command from the host, confirm that an end of data (EOD) is present on the tape media in the tape drive; and
responsive to confirming that the EOD is present on the tape media, return the ready response to the host.

15. The computer system of claim 14, wherein whether the EOD is present is based on information stored in a cartridge memory in the tape media.

16. The computer system of claim 13, wherein responsive to receiving on the tape drive the reposition command from the host, return a ready response to the host further comprises program instructions stored on the one or more computer readable storage media, to:
divide a memory buffer in the tape drive into a first area and a second area, wherein the first area is the write buffer and the second area is a reposition buffer.

17. The computer system of claim 16, wherein accumulate the write data from the host in the write buffer, wherein the write data is accumulated in the write buffer while simultaneously moving the tape media in the tape drive to the target location further comprises program instructions stored on the one or more computer readable storage media, to:
read a read data from the tape media, wherein the read data is read from the tape media during moving the tape media to the target location; and
write the read data in the reposition buffer.

18. The computer system of claim 13, wherein the target location is a target record specified in the reposition command.

* * * * *